Patented Jan. 4, 1927.

1,613,313

UNITED STATES PATENT OFFICE.

FRANK A. CSONKA, OF OAK-CREST, VIRGINIA; HARRY S. BERNTON, OF WASHINGTON, DISTRICT OF COLUMBIA; AND DAVID BREESE JONES, OF BETHESDA, MARYLAND.

PRODUCT ADAPTED FOR USE IN THE TREATMENT OF HAY FEVER.

No Drawing. Application filed April 3, 1926. Serial No. 99,635.

It is well known that the pollen grains of certain plants have the property of inducing symptoms of illness in many persons. It has been ascertained by Elliotsen (London Med. Gazette, 1831, p. 411), by Blackley (Exp. Res. on the causes and nature of catarrhus æstivus, London, 1873, Ref.; Am. J. Med. Sci. 67, p. 181), and also, by Dunbar (Zur. Ursache und spec. Heilung des Heufieber, Munchen, 1903), that the disease "hay fever" which was first described by John Bostock (Medicochirung. Trans., Vol. X, Part I, p. 161) is caused by pollen grains, upon inhalation.

Attempt has been made to prevent the recurrence of the symptoms of hay fever by a process known as desensitization which consists of the subcutaneous injection of protein solutions prepared from the pollen of plants. This procedure is, however, open to the objection that the present known solutions contain other protein fractions in addition to the active ones. Due to the presence of non-active substances in these pollen-extract preparations, it is not possible to administer accurate or controlled doses of the active fractions to hay fever sufferers (and furthermore the non-active substances contained in the preparations are believed to be of no benefit to the human system).

We have found that among the protein fractions the albumin and the proteose fractions represent the active, intoxicating factors in hay fever. It follows, therefore, that these fractions, when injected into a person susceptible to hay fever, are valuable in the preventive treatment of the disease. Our invention, therefore, relates to the preparation of specific solutions containing one or both of these active fractions in pollen obtained from plants, substantially or entirely free from other extractives, which permits accurate dosage and at the same time prevents the overloading of the human system with non-specific substances.

In order to make our invention clearly understood by anyone skilled in the art, we will proceed to explain the same by way of a few specific examples, giving the preferred method of carrying out our invention, but without limiting the scope of the same to the exact mode and particulars described.

*General procedure.*

The pollen grains of plants are extracted in salt solution, until no more nitrogenous constituents are extracted. The combined extracts are dialyzed, thus causing the separation of the inactive globulins, while the albumin and proteose stay in solution. By boiling the dialysate, the albumin fraction is precipitated. The liquid from the coagulated albumin is evaporated to a low concentration, and poured into alcohol, making the final concentration of alcohol about 70 to 80%. This precipitates the proteose fraction. By dehydrating these precipitates with alcohol and ether, a pure protein preparation is obtained, from which a known amount can be taken for preparing the protein solution that is to be used for the treatment of hay fever.

The use of ammonium sulphate shown in one of the examples which follows is optional.

*Detailed description of the active protein fractions.*

Example 1: Orchard grass.

Of the ether extracted pollen of the orchard grass, 74 gms. were extracted several times with 10% sodium chlorid solution, shaking to help the extraction of the proteins by the solvent. The total salt extracted amounted to 915 cc. The extract was transferred to a parchment bag and dialyzed for 10 days. The albumin was coagulated, filtered, and the precipitate dehydrated in the usual manner, using alcohol and ether for that purpose, weighed 0.284 gm. The filtrate was concentrated to a small volume, (about 100 cc.). Alcohol was added to make the final alcohol concentration 80%, and the precipitate so obtained, weighed 0.779 gm. representing the proteose fractions, was dehydrated as mentioned above.

Example 2: Timothy pollen.

409 gms. of timothy pollen, which had been extracted previously with ether, were extracted in two portions, with 1 liter of 10% sodium chlorid solution, using the extract from the first portion for the extraction of the second portion. By doing that, we kept the volume small. Three salt extracts, 3,140 cc., contained 2.798 gm. of nitrogen. About 25% of the nitrogen, we know from previous data, represented non-protein-nitrogen. This salt extract was practically saturated with ammonium sulphate, adding 2 kg. of the latter, which produced a flocculent precipitate. After settling over night, it was filtered through folded filter paper, and the precipitate was dissolved in 500 cc. of 10% sodium chlorid and filtered. Adding enough ammonium sulphate to make it .2 saturated, a precipitate (1) is formed which contains the bulk of the globulin. The second precipitation (2) was obtained by half saturation. We produced only the first precipitation, and the liquid from the precipitate was dialyzed separately for 10 days. The pricipitate (1) obtained at .2 saturation, after being dissolved and dialyzed for 11 days, showed a separation of the globulins, while in the second bag there was no separation. A coagulation test in the second dialysate showed turbidity at 58° C., and coagulation at 61° C. This represents the albumin. The weight of the air-dried albumin preparation obtained by heat coagulation and dehydration was .501 gm. The liquid from the albumin was evaporated down almost to dryness, taken up again in water, boiled and filtered into 4 times its volume of alcohol. The precipitate obtained, 1.274 gm., was called proteose-A.

We obtained a second proteose fraction by dialyzing the liquid obtained after the original salt extract was saturated with ammonium sulphate and filtered. After 12 days dialysis, the dialysate, not having any precipitate, was directly evaporated nearly to dryness, the residue redissolved in 100 cc. of distilled water, boiled and filtered into 4 times its volume of alcohol. The following day, there was a crystalline precipitate sticking to the wall above, and a more solid precipitate on the bottom. The liquid was poured off with the crystals, and rinsed afterward with alcohol, thus separating the crystals from the firmly settled precipitate on the bottom, which latter one we called proteose-B, representing 1.62 gms. of air-dried material.

Having thus described our said invention, what we claim is new therein, and desire to secure by Letters Patent, is:

1. A product containing one of the active protein fractions of pollen obtained from plants, substantially free from other nitrogenous constituents.

2. A product consisting of the active protein fractions of pollen obtained from plants.

3. A product consisting of the albumin fraction of pollen obtained from plants.

4. A product consisting of the proteose fraction of pollen obtained from plants.

5. A product consisting of the albumin and proteose fractions of pollen obtained from plants.

FRANK A. CSONKA.
HARRY S. BERNTON.
DAVID BREESE JONES.